Nov. 22, 1955     T. FINKELSTEIN ET AL     2,724,248
HOT AIR ENGINES AND REFRIGERATING MACHINES
Filed Jan. 30, 1953     2 Sheets-Sheet 1
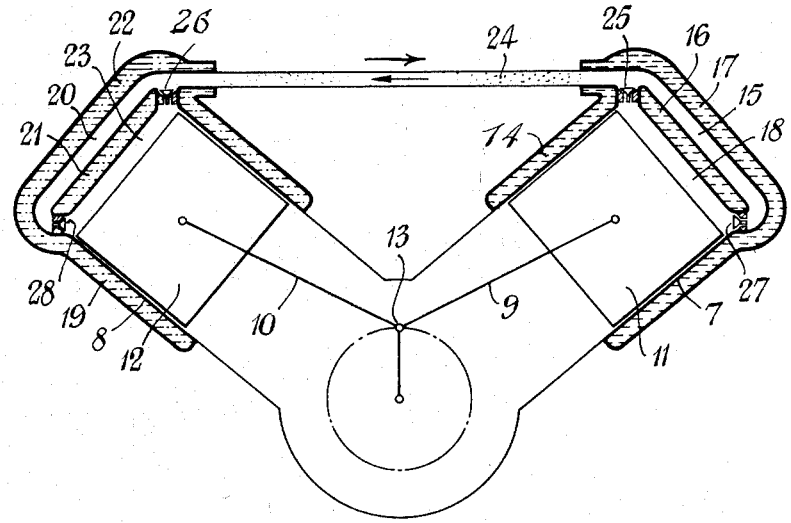
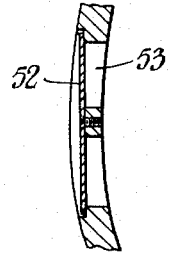
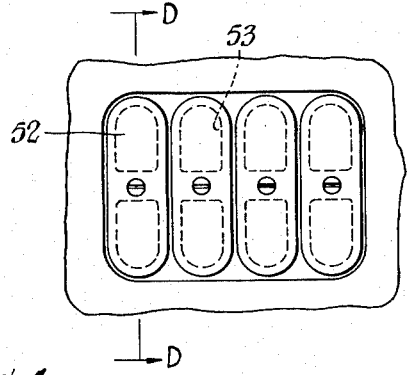
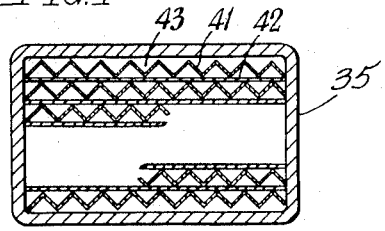
THEODOR FINKELSTEIN
HAROLD HEYWOOD
INVENTORS
Stevens, Davis, Miller & Mosher
ATTORNEYS Nov. 22, 1955
T. FINKELSTEIN ET AL
2,724,248
HOT AIR ENGINES AND REFRIGERATING MACHINES
Filed Jan. 30, 1953
2 Sheets-Sheet 2
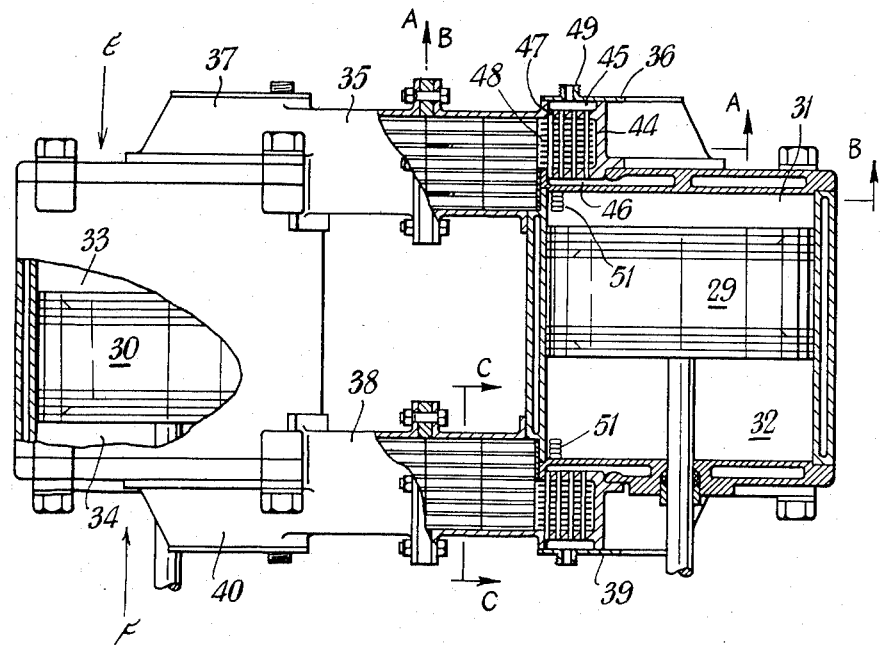
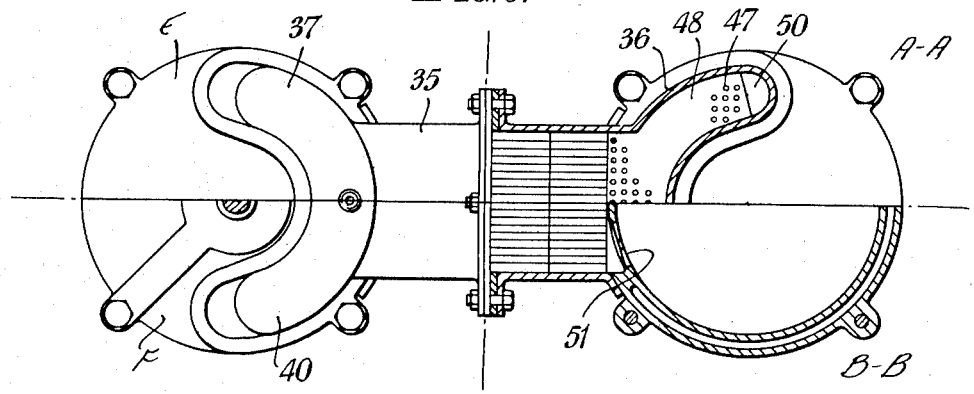
THEODOR FINKELSTEIN
HAROLD HEYWOOD
INVENTORS
Stevens, Davis, Miller & Mosher
ATTORNEYS

United States Patent Office 2,724,248
Patented Nov. 22, 1955

2,724,248

HOT AIR ENGINES AND REFRIGERATING MACHINES

Theodor Finkelstein, London, and Harold Heywood, Sidcup, England, assignors to National Research Development Corporation, London, England, a corporation of Great Britain Application January 30, 1953, Serial No. 334,238

Claims priority, application Great Britain February 8, 1952

7 Claims. (Cl. 62—136)

This invention relates to hot air engines, both in their usual form as power-producing engines and in their reversed form as heat pumps or refrigerators, working on regenerative air cycles, is concerned with their heating and cooling elements, and has for its object to increase their overall efficiency.

All efficient hot air engines working on regenerative air cycles include a heater, a regenerator and a cooler arranged in this order in a duct which forms an open connection between the hot and cold spaces of each cycle. As a consequence, considering the hot side, it will be realised that the working fluid not only passes through the heater immediately before it flows into the hot space, but also passes through the heater when flowing out from the hot space.

In a power-producing engine the passage of the working fluid through the heater is essential when the fluid enters the hot space in order to bring it up to the higher operating temperature, but on its return from the hot space this is undesirable for various reasons. For example, in actual engines the isothermal expansion which theoretically takes place when the fluid enters the hot space (for instance of a cylinder of the engine) after passing through the heater, can only be followed approximately and always there is a slight temperature drop. Consequently, when the working fluid passes out from the hot space (for instance by the return stroke of the piston in the cylinder) its temperature is again raised in passing through said heater, only to be lowered immediately afterwards by its passage through the regenerator and cooler.

Quite apart from this unnecessary and undesirable heat exchange, the efficiency is further reduced by the pressure drop imposed by the fluid passages in the heater.

Similar objections also hold good when the consideration is from the cold side.

By similar reasoning it can be shown that in hot air engines in the reversed form, it is also desirable that the working fluid should pass the heater and the cooler only once during each cycle and always in the same direction.

According to the present invention in hot air engines both in their usual form as power-producing engines and in their reversed form as heat pumps or refrigerators, by-pass means are provided both in connection with the heater and the cooler of such nature that when the working fluid passes from the regenerator to the hot space and from the hot space to the regenerator it only passes through the heater once and similarly, when the working fluid passes from the regenerator to the cold space and from the cold space to the regenerator it only passes through the cooler once.

Consequently, the operative cycle for a hot air engine in accordance with the invention is: the passage of the working fluid from the regenerator through the heater into the hot space, from the hot space directly into the regenerator, from the regenerator through the cooler into the cold space, from the cold space directly into the regenerator, and the same process is repeated for the next cycle.

This cycle applied to heat pumps and refrigerators involves the same steps but in the reversed order, namely: from regenerator directly to the hot space, from the hot space through the heater to the regenerator, from the regenerator directly into the cold space, from the cold space through the cooler into the regenerator, after which the sequence is repeated for the next cycle.

As a practical example of the temperatures involved, in power-producing engines the hot space may be at approximately 400° C. and the cold space at approximately 50° C., while in a heat pump or refrigerator the hot space may be at approximately 50° C. and the cold space at approximately —20° C.

In practical constructions the by-pass means may be comprised by suitable fluid-controlled valves which can be of simple construction since slight leakage is of no great consequence to the thermodynamic cycle. Even when closed the pressure difference across them is only the pressure drop across the heater or the cooler caused by aerodynamic friction. Hence, simple flap valves may be employed for the purpose.

According to a subordinate feature of the invention, in practical constructions the entry ports for the working fluid to the hot and cold spaces of cylinders may have one-way valves so that the fluid after having passed through the heater or cooler, as the case may be, enters the requisite cylinder.

It will be realised the invention is applicable to any single- or multi-cylinder, single- or multi-cycle construction, according to requirements.

In order that the invention may be better understood, it will now be described with reference to the accompanying somewhat diagrammatic drawings which are given by way of example only and in which:

Fig. 1 is a diagrammatic elevation of a simple single-cycle engine with the invention applied thereto.

Fig. 2 is an elevation, partly in section and partly broken away, of a portion of another engine embodying the invention.

Fig. 3 is a general plan view of Fig. 2, the upper portion of the left-hand side showing a top plan viewed from the direction of arrow E in Fig. 2, the lower portion of the left-hand side showing a plan from below viewed from the direction of arrow F in Fig. 2, the upper portion of the right-hand side showing a section on the line A—A, Fig. 2, and the lower portion of the right-hand side showing a section on the line B—B, Fig. 2.

Fig. 4 shows a cross section through a regenerator of the embodiment shown in Figs. 2 and 3 on the line C—C, Fig. 2, and with parts shown of exaggerated size and section for the sake of clearness.

Fig. 5 shows to a much larger scale a by-pass valve of the engine shown in Figs. 2 and 3, and Fig. 6 is a section on the line D—D, Fig. 5.

According to the particular simple method of carrying the invention into effect shown in Fig. 1, two cylinders 7 and 8 are provided and these are arranged in V formation with the cylinder axes inclined at an angle of 100° or thereabouts with the connecting rods 9 and 10 of single-acting pistons 11 and 12 mounted on the same crank-pin 13. One cylinder 7 has its walls jacketed at 14 for heating purposes and at its head has a heater space 15 for spaces 16 and 17 constituting between themselves a heater by which the hot space 18 of the said cylinder 7 is kept at the higher operating temperature by hot fluid flowing through the spaces 16 and 17 to constitute the heater and also through the jacket 14. In a similar manner, the cylinder 8 has its walls jacketed at 19 for cooling purposes and at its head has a cooling space 20 for spaces 21 and 22 constituting between themselves a cooler by which the cold space 23 of the said cylinder 8 is kept at the lower operating temperature by the coolant flowing through the spaces 21 and 22 to constitute the cooler and also through the jacket 19.

Any suitable fluid to carry the required temperature, for example 300° C., can be used to pass through the spaces 16 and 17 and the jacket 14 in an ordinary known and approved manner. The construction may also be modified to use a permanent gas as the heating fluid so that higher temperatures may be employed. Similarly, any suitable coolant can pass through the corresponding spaces on the cold side.

24 is the regenerator of any suitable form (an example will be described hereafter) connected to the heater 15 and the cooler 20 in any usual manner. However, the outlet from the hot space 18 of the cylinder 7 is guarded by a one-way valve 25 constituting by-pass means whereby the operating fluid can pass from the hot space to the regenerator without passing through the heater 15 when the volume of the hot space is decreasing but which is closed for the entry of the operating fluid into the hot space until it has passed through the said heater 15 when the volume of the hot space is increasing.

In a similar manner, the outlet on the cold side is guarded by a one-way valve 26 to allow what may be termed the exhaust from the cylinder 8 to by-pass the cooler 20 and pass direct to the regenerator 24. Although not necessary, the entry port into the cylinder 7 may be guarded by a one-way valve 27 and similarly the entry port to the cylinder 8 may be guarded by a one-way valve 28.

In the result, in the operation of the cycle the working fluid will pass through the heater 15 to flow into the hot space 18 from the regenerator 24 passing through a valve 27 if such a valve is provided. Subsequent to the downward action of the piston 11 and then its return action, the said fluid cannot pass through the space 15 if a valve 27 is provided but emerges through the one-way valve 25, that is to say, when it passes from the hot space 18 to the regenerator 24. Where a valve 27 is not provided, aerodynamic friction in the heater will cause most of the working fluid to pass through the valve 25 instead of passing through the heater.

Without repeating the precise details it will be understood that the same holds good in the action from the cold space 20 to the regenerator, and vice versa.

In some cases, in place of locating the by-pass valves such as 25 and 26 directly at the cylinder ends, they may be disposed some distance from such cylinder ends so as to provide entry into the regenerator 24 slightly beyond the entrances and exists of such regenerator.

In the method of carrying the invention into effect shown in Figs. 2 to 6, here a cylinder arrangement of an engine with two pistons 29 and 30 with their axes parallel is shown, to work on two cycles, the cylinder on the right having hot spaces 31 and 32 on each side thereof and the cylinder on the left cold spaces 33 and 34 on each side thereof.

The hot space 31 on one side of the piston 29 of one cylinder is connected to the cold space 33 on one side of the piston 30 of the other cylinder by a regenerator 35 through a heater 36 on the one hand, to be more particularly described hereafter, and a cooler 37. In a similar manner, the hot space 32 on the other side of the first-mentioned piston 29 is connected to the cold space 34 on the underside of the second piston 30 through a regenerator 38, heater 39 and cooler 40.

In the structure shown, the regenerator consists of alternating thin conducting plates 41 and 42, the first being given a corrugated or reversed triangular shape as shown in Fig. 4, whilst the second is flat. In this manner a great many passages 43 are built up longitudinally of the regenerator. It should be observed in connection with Fig. 4 that the corrugated or shaped plates 41 are shown greatly exaggerated both in thickness, spacing and otherwise. In other words, in the depth of the regenerator there will be many more such plates and many more plates such as 42 whose thickness also has been exaggerated. Thus, in the total result the regenerating absorption surfaces will be multiplied to a much greater extent than would be that of the structure actually shown in Fig. 4.

Regarding the heater 36, in this case it is shown in the upper part of Fig. 2 (although there is a similar heater in the lower part) and comprises a main space 44 of segment form (nearly embracing a semi-circle) having headers 45 and 46 with tubular conduits 47 to a required number passing between the headers, carrying spaced plates 48 in such a way that the main space communicates directly with the regenerator whilst the header 45 receives the heating fluid through an inlet 49. (In the case of the cooler 37, a coolant is received and the construction of the cooler is similar.)

The heating fluid passes through the tubular conduits 47 and imparts its heat mainly by the spaced plates 48 so that the working fluid passing between and through these spaced plates takes up the heat therefrom before it passes by the inlets 50 (only one of which is shown in Fig. 3) into the hot space 31.

It will be appreciated that on the underside of the piston 29 the hot space 32 has a similar action through the heater 39 and regenerator 38.

Obviously, from the cold spaces 33 and 34 the action is reversed through the coolers 37 and 40 through the regenerators 35 and 38.

In accordance with the present invention, regarding the engine arrangement as shown in Figs. 2 and 3, each hot and cold space has provided therein a one-way valve forming a by-pass to allow the exit of the working fluid from the hot spaces direct to the regenerators and the exit of the working fluid from the cold spaces to the regenerators. This is shown briefly in each case by 51 in Figs. 2 and 3.

However, it is shown more fully in Figs. 5 and 6 where one-way reed or flap valves 52 normally cover ports 53 but are so lightly sprung that on the return of the pistons they open to by-pass working fluid to obviate its passage through the heater or cooler, as the case may be.

It will be understood that in addition to the main components as hereinbefore mentioned, hot air engines, heat pumps or refrigerating machines according to the invention may have any other usual components such as means for heat supply or rejection, auxiliary pumps for raising the mean working pressures, and other constructional details.

The invention is not limited to the precise forms or details of construction herein set forth, as these may be varied to suit particular requirements.

What we claim and desire to secure by Letters Patent of the United States of America is:

1. A hot air engine operating on a regenerative air cycle, both in its usual form as a power-producing engine and in its reversed form as a heat pump or refrigerator, in which by-pass means are provided both in connection with the heater and the cooler, of such nature that when the working fluid passes from the regenerator to the hot space and from the hot space to the regenerator it only passes through the heater once and similarly when the working fluid passes from the regenerator to the cold space and from the cold space to the regenerator it only passes through the cooler once.

2. A hot air engine as claimed in claim 1 in which the by-pass means are constituted by one-way valves, for the purposes set forth.

3. A hot air engine as claimed in claim 2, in which each hot and cold space has two sets of valves, one set operating as an inlet and the other operating as an outlet.

4. A hot air engine as claimed in claim 2, in which the valves are lightly loaded flap valves.

5. A hot air engine as claimed in claim 3, in which the valves are lightly loaded flap valves.

6. A hot air engine operating on a regenerative air cycle as a power-producing engine in which the cycle for the working fluid from any starting point is as follows: the passage of the working fluid from the regenerator through the heater into the hot space, from the hot space directly into the regenerator, from the regenerator through the cooler into the cold space, from the cold space directly into the regenerator, and the same process is repeated for the next cycle.

7. A hot air engine operating on a regenerative air cycle as a heat pump or refrigerator, in which the cycle for the working fluid from any starting point is as follows: from the regenerator directly to the hot space, from the hot space through the heater to the regenerator, from the regenerator directly into the cold space, from the cold space through the cooler into the regenerator, after which the sequence is repeated for the next cycle.

References Cited in the file of this patent

UNITED STATES PATENTS

| | | |
|---|---|---|
| 2,328,439 | Esnault-Pelterie | Aug. 31, 1943 |
| 2,480,525 | Van Weenen | Aug. 30, 1949 |
| 2,484,392 | Van Heeckern | Oct. 11, 1949 |